United States Patent [19]

Olson et al.

[11] 4,455,066
[45] Jun. 19, 1984

[54] TRANSPORT FOR DISPLAY TERMINAL

[75] Inventors: Roy H. Olson, Palos Verdes Estates; Tor H. Petterson, Rancho Palos Verdes; William E. Roberts, Rolling Hills Estates, all of Calif.

[73] Assignee: Logicon, Inc., Torrance, Calif.

[21] Appl. No.: 101,627

[22] Filed: Dec. 10, 1979

[51] Int. Cl.³ .................. B65H 23/18; G03B 23/08; G03B 23/12
[52] U.S. Cl. .................. 353/26 R; 353/26 A; 353/95
[58] Field of Search ............ 353/26 R, 26 A, 95

[56] References Cited

U.S. PATENT DOCUMENTS

| | | | |
|---|---|---|---|
| 2,265,992 | 12/1941 | Beck | 353/78 |
| 3,184,177 | 5/1965 | Hannah | 242/55.12 |
| 3,290,987 | 12/1966 | James et al. | 353/26 A |
| 3,528,733 | 9/1970 | Pratt et al. | 353/95 |
| 3,661,382 | 6/1972 | Struzna | 353/26 A |
| 3,824,008 | 7/1974 | Smith | 353/26 A |
| 4,174,890 | 11/1979 | Johnson et al. | 353/26 A |

Primary Examiner—Steven L. Stephan
Attorney, Agent, or Firm—Freilich, Hornbaker, Rosen & Fernandez

[57] ABSTRACT

A display terminal is provided which holds a roll of film, and can project the image of any film frame onto a console screen. The need for a platen to precisely locate a frame on the optical imaging plane, is avoided by keeping the film in tension. The tension is maintained while the film is stationary, by utilizing a pair of reel-driving motors that each provide a torque that varies with the diameter of the film roll on the corresponding reel. The film region being projected, can be held in a slight curve to more reliably hold all areas of the projected film region near a predetermined film plane. A film identification track and clock track can extend along one edge of the film to identify every frame and accurately center the frame at the imaging, or projection, station. The film can be rapidly moved to bring a desired frame to approximately the imaging station, with slight overshoot, and the film then can be inched back to center the frame.

1 Claim, 17 Drawing Figures

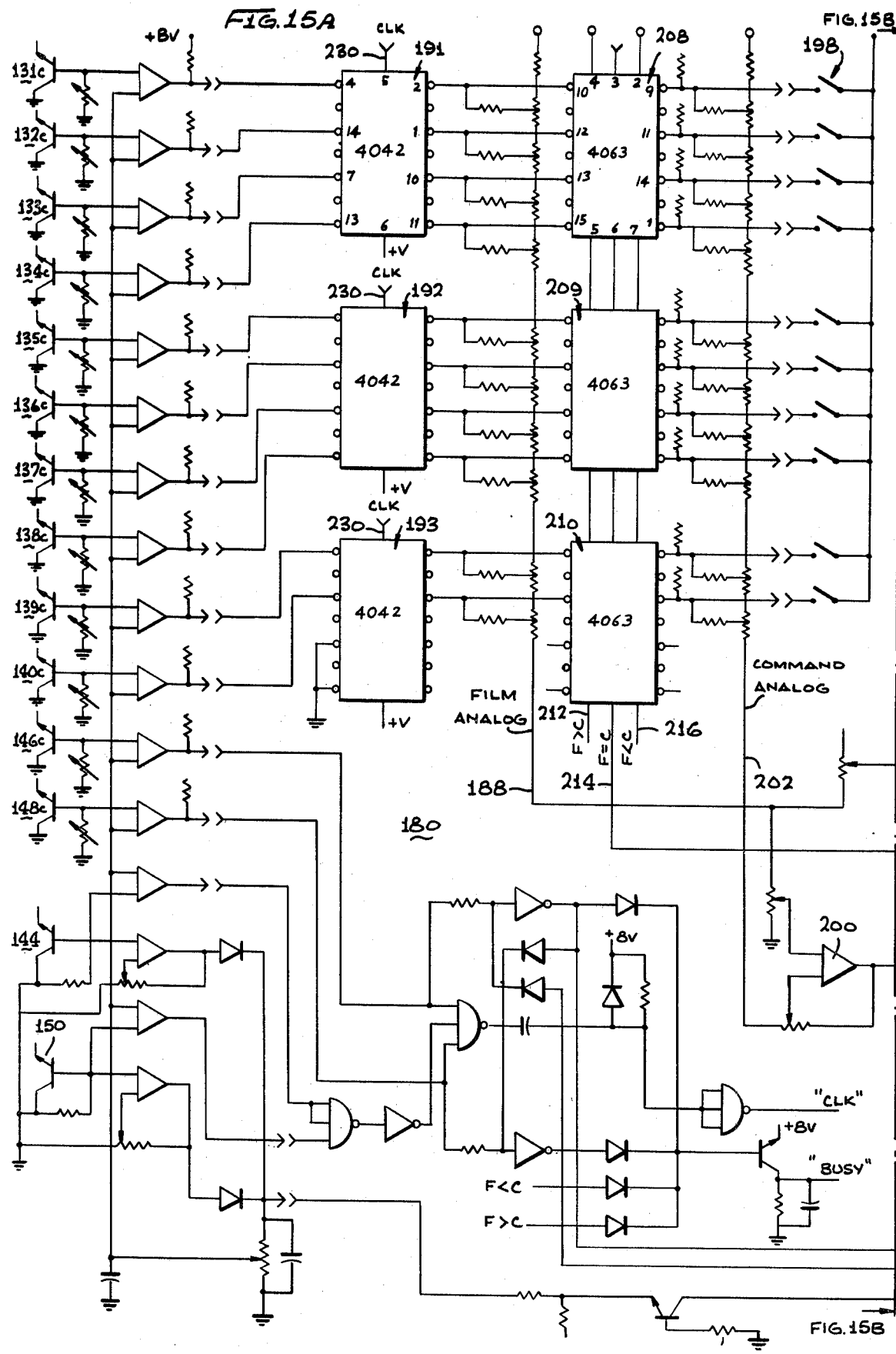

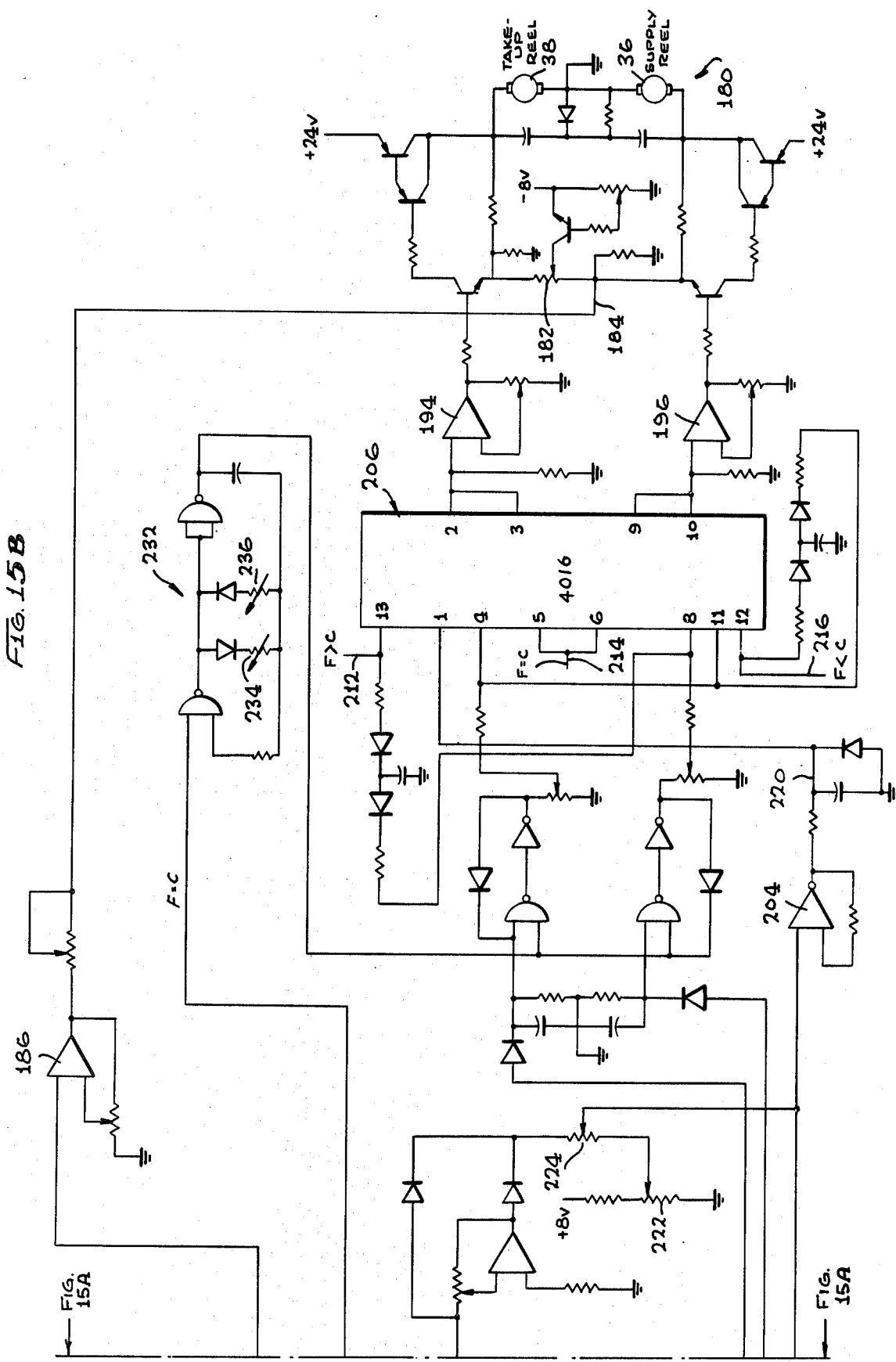

TRANSPORT FOR DISPLAY TERMINAL

BACKGROUND OF THE INVENTION

A terminal that projects frames of a film roll onto a screen, requires apparatus for locating the desired film frame accurately at a projection position. The film can be accurately located at the projection place by the use of a transparent platen. However, such a platen can scratch the film when the film later moves. The selection of the particular film frame and the accurate centering of the frame at the projection location, can require complicated sensor and transport arrangements. A transport of relatively simple design which could accurately locate a film frame, by selecting the desired frame, centering it at the projection location, and positioning it along a predetermined film plane, would be of considerably value.

SUMMARY OF THE INVENTION

In accordance with one embodiment of the present invention, a display terminal is provided of the type which includes a film strip which can be moved between a pair of reels to bring any film frame to an imaging station. The need for a platen at the imaging station, and consequent possibility of film scratching, is avoided by maintaining tension in the film even while it is stationary. A separate reel motor is connected to each reel to apply torque to it, to maintain the film tension, and a circuit is provided which determines the relative sizes of film rolls on the reels to vary motor currents. The motor currents are controlled so that the same tension force is applied to each end of the film strip portion extending between the reels, to keep the film stationary while maintaining it in tension.

The film at the imaging station, which is free of direct platen support, can be stiffened against uncontrolled bending by holding it slightly curved. This can be accomplished by using guides at either edge of the film which cause the film to be slightly curved about an axis perpendicular to the length of the film strip.

The film strip is encoded along a narrow track area by utilizing a group of locations beside each film frame to identify that frame. At each of the group of locations, the film is either transparent or opaque to identify a binary number. A second track identifies the middle of each frame.

The novel features of the invention are set forth with particularity in the appended claims. The invention will be best understood from the following description when read in conjunction with the accompanying drawings.

BREIF DESCRIPTION OF THE DRAWINGS

Figure 2:
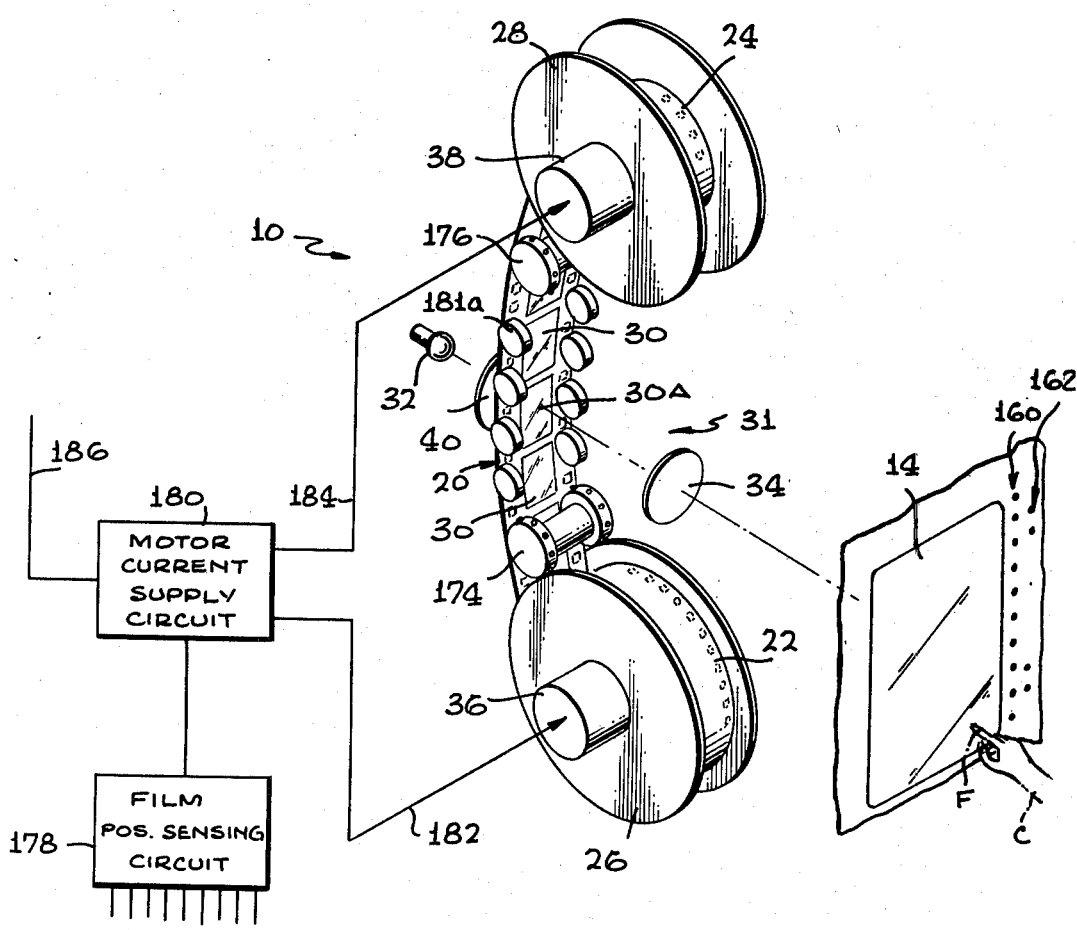
FIG. 2 is a simplified perspective view of the mechanism and circuitry of the terminal of FIG. 1.

FIGS. 15A and B are a schematic diagram of a circuit of the apparatus of FIG. 2.

DESCRIPTION OF THE PREFERRED EMBODIMENTS

Figure 1:
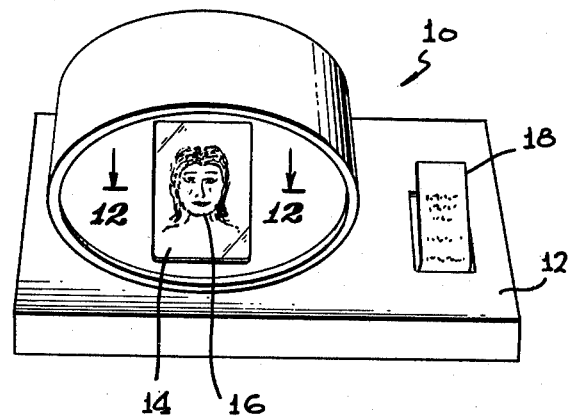
FIG. 1 is a perspective view of a merchandising terminal constructed in accordance with the present invention.

FIG. 1 illustrates a merchandising terminal 10 which includes a console 12 having a screen 14 which can display images such as 16. The particular terminal is utilized to aid a potential customer in the selection of cosmetics. The terminal displays images on the screen which represent different possible conditions of the customer, such as different skin and hair colors, skin oilyness, etc. and the customer can select which of the conditions apply to her by touching selected portions of the screen 14. After these various inputs are received from the customer, the console delivers an output in the form of a printed sheet 18 which lists various recommended items for that customer.

As shown in FIG. 2, the terminal includes a film 20 in the form of a long filmstrip having opposite ends formed in rolls 22, 24 held on reels 26, 28. The filmstrip has multiple frames 30 spaced along its length, with some of these frames containing the images representing possible conditions of the customer. Light from a lamp 32 can pass through a selected film frame 30A at an imaging station 31 and through a lens 34 which forms an image of the frame onto the screen 14. The film is advanced by a pair of reel drive motors 36, 38 whose rotors are connected to the reels 26, 28. A shutter 40 blocks the passage of light through a film frame while the film strip is moving, until a particular frame selected by the circuitry of the terminal is positioned behind the lens 34. Many of the film frame images include designated areas which can be touched by a customer to chose one of several statements or models that most closely represent her. The customer C can select a particular image portion by extending her finger F and touching the screen 14 at the desired area. Her finger will then interrupt one of a group of infra red light beams crossing in front of the screen, and the interruption will be sensed by a photocell.

Figure 3:
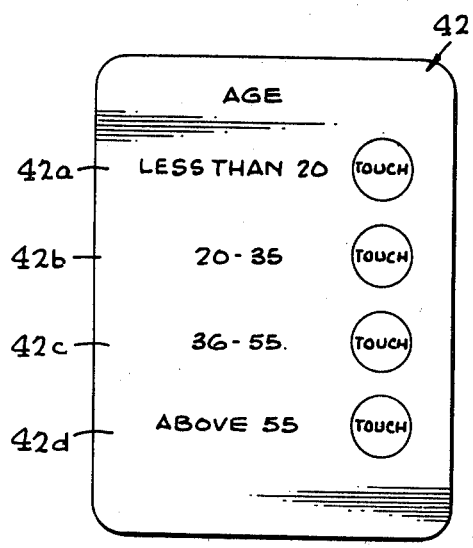
FIGS. 3-6 are plan views showing displays which can be produced on the screen of the terminal on FIG. 1 to aid in the selection of cosmetics.

FIGS. 3-6 illustrate some of the film frame images that can be utilized in the marketing of cosmetics. Each of these condition-representing frames represent different facial conditions of a person, with the term "facial" including hair conditions (color, oilyness, etc. of hair). FIG. 3 shows an image 42 which includes several image portions 42a-42d indicating four different age ranges for a person who is a potential customer for cosmetics. The age range is requested because it can provide a fairly reliable indicator of certain conditions of the skin of a person, and also can provide an indication of certain styles or appearances that might be appropriate for the customer. The customer selects the appropriate range by touching the screen at one of the areas such as 44 which is contained within a circle and which includes the word "touch".

Figure 4:
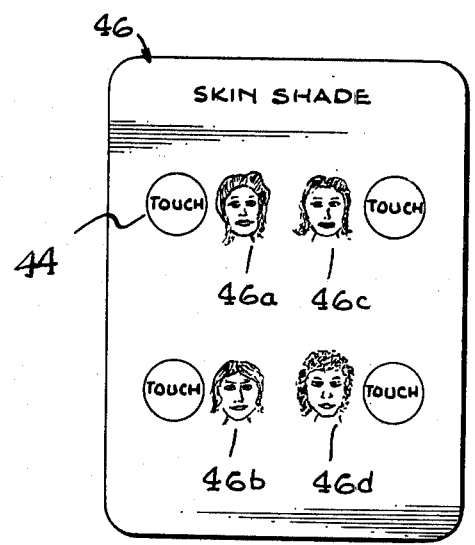

FIG. 4 is an image 46 representing the skin color of the customer and includes four image regions 46a–46d. Each region such as 46c includes the picture of a model indicating the general appearance of a person with the indicated skin tone, to aid in the selection. This is useful because the hair style and color of a person shown in combination with the skin color of the person, can provide a better indication to a customer as to what color range is intended than merely an area of that color without a model.

Figure 5:
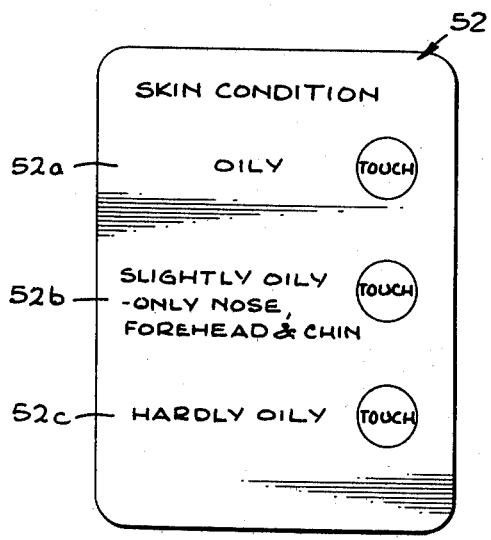
Figure 6:
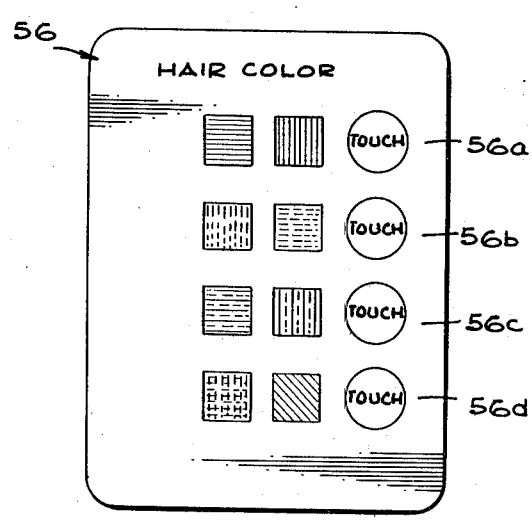

FIG. 5 shows an image 52 which has three regions 52a–52c denoting three different ranges of oilyness of skin at the face of a person. The designations are made in terms that can be most easily comprehended by an average consumer. Thus, instead of indicating only ranges such as dry or very oily, the area of the face in which a noticeable oilyness occurs is designated in the middle area 52b. FIG. 6 illustrates an image 56 having four regions 56a–56d representing four ranges of hair colors. Each region contains boxes showing slightly different hair colors, so that a customer whose hair matches one box in a region is less likely to be confused as compared to the situation where only one color was shown.

A group of introductory film frames can be provided to explain to the customer what the terminal will do and how it is to be operated. Following this, a series of frames such as those shown in FIGS. 3-9 can be displayed in sequence, with each frame being shown until the customer touches a "touch" area at one of the regions to select the corresponding statement or condition. The frames denoting different customer conditions are shown in succession; that is, separate frames are shown that denote customer conditions, even though intermediate frames can be included which do not show customer conditions to be selected. Following the making of selections by the customer, a film frame image such as that shown at 16 in FIG. 1, can be displayed, which represents a model closely matching the customer in characteristics, such as the selected age range, skin tone, facial shape, hair color, etc. Also, the printout 18 is provided which lists the products which are recommended for that customer, such as a particular makeup base, face powder, lipstick, and nail polish. The list can indicate the group of cosmetics for a particular group of clothing colors, and can indicate a different group of cosmetics for another group of clothing colors.

Figure 13:
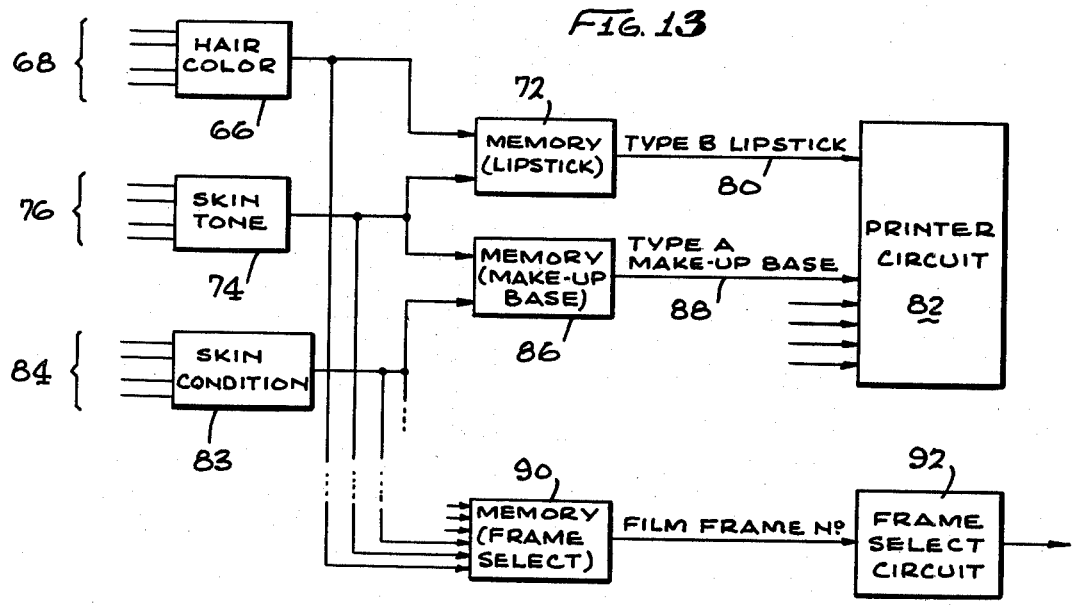
FIG. 13 is a simplified logic diagram of the apparatus of FIG. 1, showing how the viewer inputs can be utilized to generate product selection outputs.

FIG. 13 is a simplified view of logic circuitry which utilizes the customer selections to select a particular model representing the appearance of the customer when the recommended cosmetics are used by her, and which also provides the printout of recommended cosmetics. A decoder 66 has four inputs 68 that are connected to photocells that detect the touching of the different touch areas of different regions 56a–56d in FIG. 6, and has an output 70 that is delivered to a memory 72. The decoder when utilized at 74, has four inputs 76 that sense which of four skin tones has been selected for the image 46 of FIG. 4. The output 78 of the skin tone detector is also delivered to the memory 72. The memory 72 is a look up table which selects one of a group of different lipstick designations, in accordance with the particular hair color and skin tone of the customer as indicated by the outputs on lines 70 and 78. The output of the lipstick memory 72 is delivered over a line 80 to a printer circuit 82 which will print out the particular lipstick product name on the printout 18 of FIG. 1.

A skin condition detector 83 which has inputs 84 connected to photocells that detects the selections made for the image of FIG. 5, has an output 86 connected to a makeup base lookup memory 86. The memory 86 has another input connected to the skin tone detector 74. The makeup base memory 86 delivers an output over line 88 to the printer circuit 82. The output on line 88 designates a particular makeup base for the customer, based upon the skin tone and skin condition (as indicated by the age of the customer). Of course, more than two designations can be utilized in selecting a particular cosmetic. In addition, the outputs 70, 78, 86 from the detectors, are delivered to a frame select memory 90 which selects one of a large number of film frames on the film strip 20 of FIG. 2, where the image of the frame contains a model having a hair color, skin tone, skin condition or age, and other parameters closely representing that of the customer as indicated by the selections made by the customer. A signal representing a particular frame number is delivered to a frame selecting circuit 92 which operates the reel-driving motors to advance the film until the selected frame is positioned to be projected onto the screen of the console.

Figure 14:
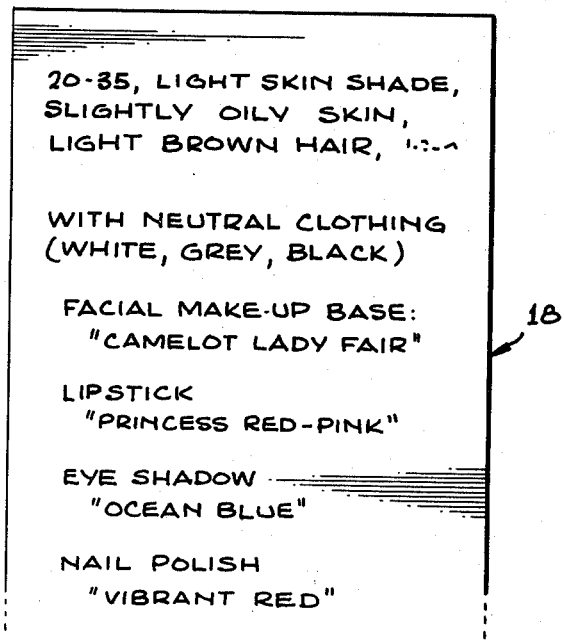
FIG. 14 is a plan view of a portion of a printout of the apparatus of FIG. 1.

FIG. 14 shows a portion of the printout 18 of FIG. 1 which is generated by the merchandising terminal. The printout 18 designates a group of cosmetics which are especially suited for the customer, and furthermore, designates a plurality of groups of cosmetics, with each group being described as particularly useful for a particular condition such as when the customer is wearing certain clothes colors. After the printout moves out of the machine, the customer can tear off the printout and keep it, for use as a reference in selecting cosmetics in the future.

Figure 12:
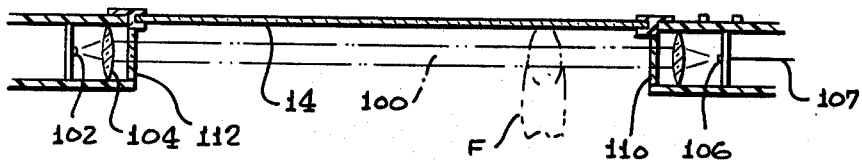
FIG. 12 is a partial sectional view taken on the line 12—12 of FIG. 1.

As mentioned above, the customer who is viewing a particular film frame imaged on the screen of the console, selects one of several regions by touching a "touch"-designated area on the image. FIG. 12 shows how the index finger F of the customer can be utilized to make the selection by pressing it against the screen 14. A beam 100 of infrared electromagnetic energy which is generated by a light emitting diode 102 and collimated by a lens 104, will be interrupted by the finger F. A photocell 106 which is especially sensitive to infrared beams, can detect the interruption of the beam and deliver a signal over an output line 107 to a switching mechanism which delivers the signal to a corresponding one of the detectors such as 66 of FIG. 13. This general type of touch sensor, which has been known in the prior art, may utilize a column of photocells such as 106 to detect the vertical position of the finger, and may also employ a horizontal-extending row of photocells at the top or bottom of the screen to detect the horizontal position of the finger which interrupts a corresponding vertical infrared beam.

In order to encourage operation of the terminal by the customer, it is useful to avoid distractions, and it is also useful to provide an interesting and somewhat mysterious machine operation. The customer may be curious as to how the machine detects the location at which she touches the console screen. If the photocells 106 can be seen by the customer, then her attention is likely to be directed by them so that the customer's attention is diverted from intended operation of the terminal. The cells 106 should not be blocked by an opaque area, since electromagnetic energy must reach them. In order to permit operation of the photocells by the infrared beam while minimizing the possibility of customer distraction, a selective cover 110 is provided along an edge of the screen. The cover 110 is constructed of a material that is transparent to infrared electromagnetic energy generated by the emitter 102 bus is opaque to light in the visible spectrum. Filter glasses are available which can pass only selected spectrums of radiant energy. Thus, the apparatus can operate to permit detection of the interruption of the beams by the photocells such as 106, while preventing the customer from seeing the photocells. In a similar manner, an infrared-transmitting but visible light blocking window 112 can be positioned over the light source. It is noted that the term "light" herein refers to transmittable energy which includes light in the infrared to ultraviolet spectrum or even beyond.

Figure 9:
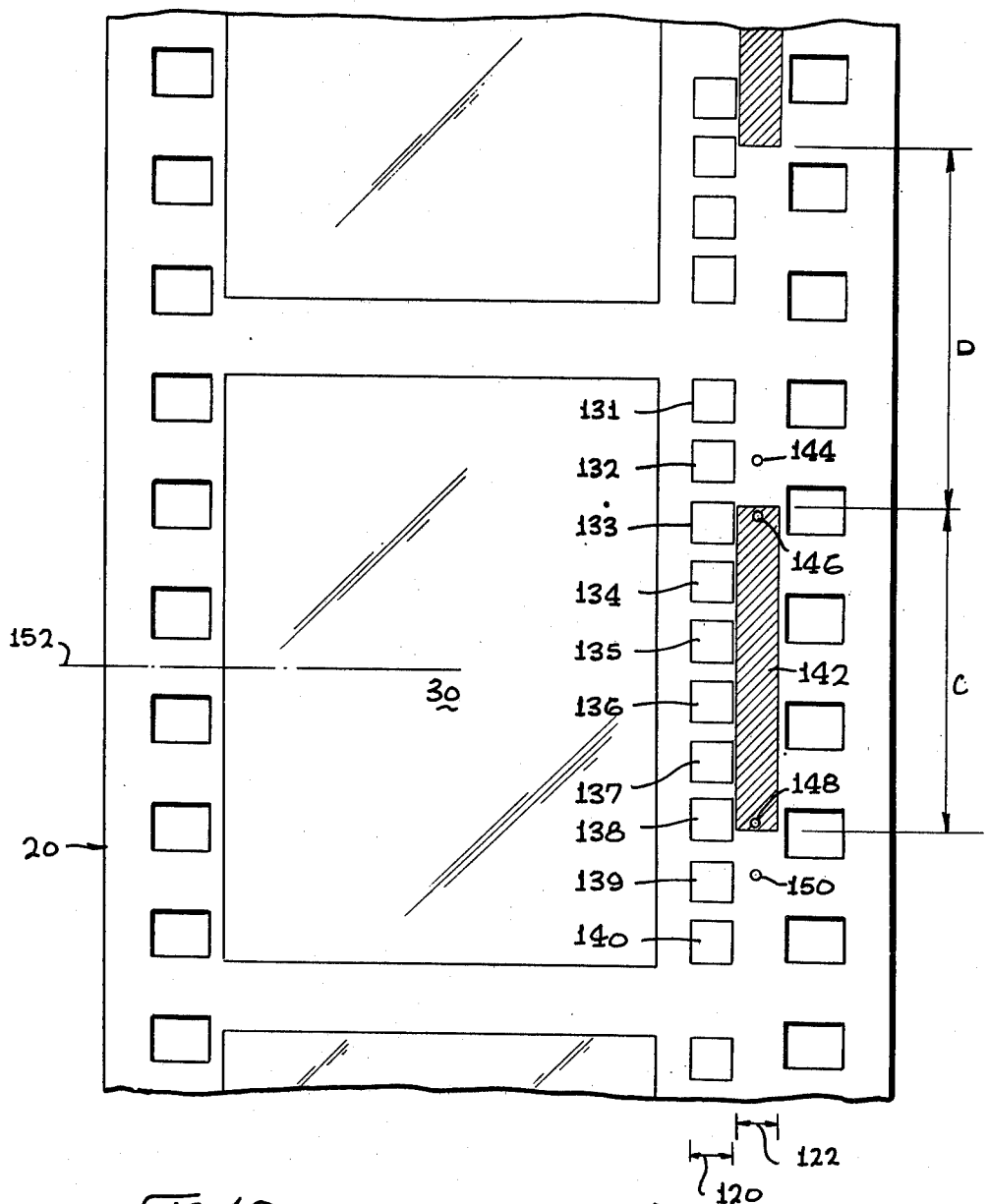
FIG. 9 is a partial plan view of a film strip of the apparatus of FIG. 7, showing the layout of the film and the significance of different locations thereof.
Figure 10:
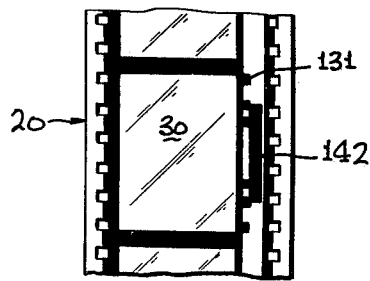
FIG. 10 is a plan view of a particular film frame formed in accordance with the layout of FIG. 9.

The indentification of the film frames on the film strip, is accomplished as indicated in FIGS. 9 and 10, by utilizing a frame identification track 120 and a frame position-indicating track 122. As shown in FIG. 9, ten bit positions 131–140 are defined along the identification track 120 beside each film frame 30 to define that frame out of a group of up to 1,024 different frames spaced along the film strip. At each bit position such as 131, the value ("0" or "1") defined by that position is determined by whether that region of the frame is transparent or opaque. In FIG. 9, a decimal number is printed in each bit position to indicate the binary value or significance of each bit position. The binary value of each bit position of a frame can be sensed by the use of ten photocells to determine whether each position is transparent or opaque. Such photocells could be positioned directly in front of the frame identification track 120 at locations spaced apart by the same distance as the bit positions, although a somewhat different scheme is utilized, as will be described below.

The frame position-indicating track 122 includes a clock marking 142 which lies beside each film frame and is centered thereat. The clock marking is formed by making the film opaque thereat, and the rest of the track 122 is transparent. The clock markings 142 are utilized to sense the precise position of the film strip with respect to the closest film frame 30, which is useful to determine when the clock bits 131–140 are positioned so that their images are projected onto a corresponding set of ten photocells, and also to enable the precise positioning of the film strip so that the image at the frame 30 is centered on the console screen. The position of the clock marking 142 can be determined by the use of four stationary photocells indicated at positions 144–150. The two photocells 146, 148 are spaced apart by slightly less than the length C of each clock marking. It may be noted that the length of the clock marking 142 is small enough so that it is considerably less than the spacing D between successive clock markings along the length of the film strip. When the two photocells 146, 148 are both dark, then it is known that the film frame 30 is precisely centered on the center line 152 of the projection station. The additional photocells 144 and 150 are provided to enable detection of burn out or partial change of output of the lamp which shines light through the film and also can be utilized to monitor the system for proper operation.

Figure 7:
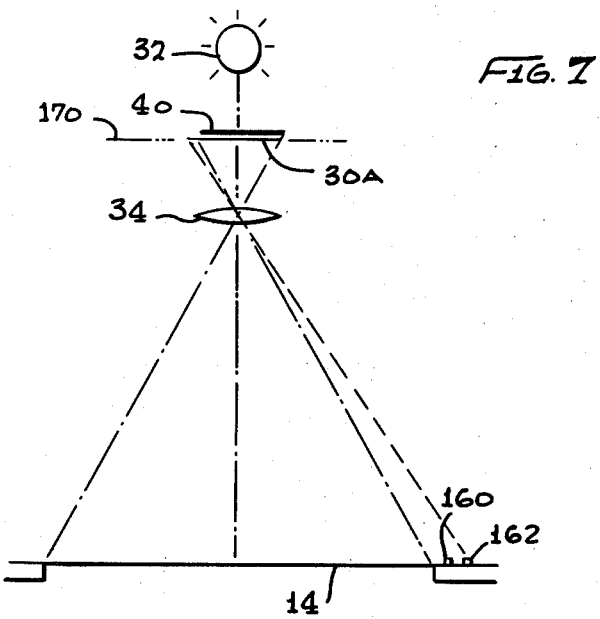
FIG. 7 is a simplified sectional view of a portion of the apparatus of FIG. 2.
Figure 11:
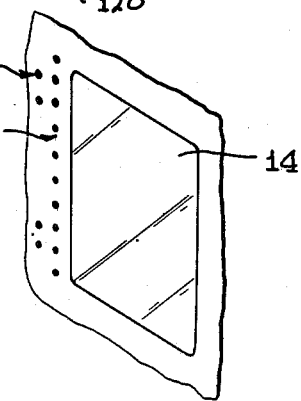
FIG. 11 is a partial perspective view of the apparatus of FIG. 7, showing apparatus for detection of the frame encodings of FIGS. 9 and 10.

FIGS. 2 and 7 show the manner in which information on the two film tracks 120, 122 of FIG. 9 are sensed by two groups of photocells 160, 162, with the photocell group 160 including ten photocells at positions corresponding to the ten bit positions 131–140 of FIG. 9 and the group 162 including four photocells positioned in accordance with the spacing of the detection positions 144–150. The same lamp 32 and lens 34 that are utilized to form an image of each film frame on the screen, is also utilized to form an image of each bit or clock marking on the tracks 120, 122 onto the groups of photocells 160, 162 which lie beside the screen 14. A shutter 40 blocks light from passing through each film frame when the filme is being moved, but the shutter is designed so that even in its closed position it permits light from the lamp 32 to pass through the film tracks 120, 122 so that light shines onto the groups of photocells 160, 162. FIG. 10 shows a portion of a typical film frame region of the filmstrip 20, while FIG. 11 shows a region around the back of the screen 14, and shows the positions of the groups of photocells 160, 162 thereat.

In order for a sharp image of the film frame to be projected onto the console screen, the frame 30A (FIG. 8) at the projection location must be maintained accurately on a film plane 170. The film frame at the projection station can be held flat against the surface of a transparent platen that contacts the film but unless a mechanism is provided to withdraw the platen from the film every time it is moved, scratching of the film could occur. To avoid film scratching or the need for a complex mechanism to hold the film accurately at the film plane 170, the film strip is maintained in tension while it is stationary and the image of the frame at 30A is being projected onto the screen. To maintain such tension, both motors 36, 38 (FIG. 2) which are connected to the reels are energized to rotate the reels in directions to tend to wind up the film. A pair of sprocket wheels 174, 176 guide the film extending from each wheel to position the film substantially along the plane 170.

In order to prevent motion of the film while current is being applied to both of the reel motors 36, 38 to maintain film tension, the current applied to each of the motors is adjusted so that each reel applies the same tension to the corresponding end of the film strip portion which extends between reels. When the roll of film on a reel is of small diameter, a given motor current and motor torque produce a large tension force on the film strip. When the roll of film on the reel is large, the same motor current and torque will result in the roll applying a much smaller tension force to the filmstrip. If the tension force applied by the two reels are considerably uneven, the film strip will move instead of remaining stationary. To avoid this, a film position sensing circuit is provided which senses the relative amounts of film on the two reels and which adjusts the current to the reel motors to cause each reel to apply the same tension force to its end of the film strip.

FIG. 2 shows a film position sensing circuit 178 having multiple inputs connected to the group of ten photocells at 160 that detect the particular frame located at the projection position. The circuit 178 is connected to a motor current supply circuit 180 which has two outputs 182, 184 that deliver currents to the two reel motors 36, 38 from a current supply 180. The film strip position sensed by the circuit 178 indicates the relative diameters of the two film rolls 22, 24 on the two reels 26, 28, and the motor current supply circuit 180 adjusts the relative current to the two motors 36, 38 in the same proportion as the diameters of the film rolls, when the film strip is stationary. The circuit 180 is constructed to account for the diameters of the reel hubs, the spacing between the film frames, and the like to determine relative sizes of film rolls. Of course, a much larger current is applied to one of the reel motors when the film strip must be moved. Instead of sensing film frame numbers, it would be possible to merely count movement of the film as by counting the passage of clock markings 142 on the film frame or the number of rotations of one of the guide rollers 174 or 176 to determine the relative sizes of the film rolls. However, the identity of each film frame must be sensed anyway, and relatively inexpensive circuitry can be utilized to convert this to roll diameters. It is also possible to provide a feeler at each film reel to sense the diameters of the rolls thereon, although such a sensor can add to the complexity of the apparatus.

Figure 8A:
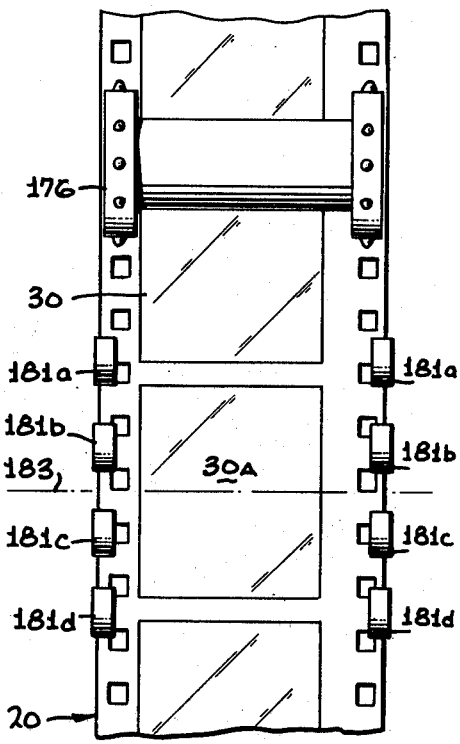
FIG. 8A is a view taken on the line 8A—8A of FIG. 8.
Figure 8:
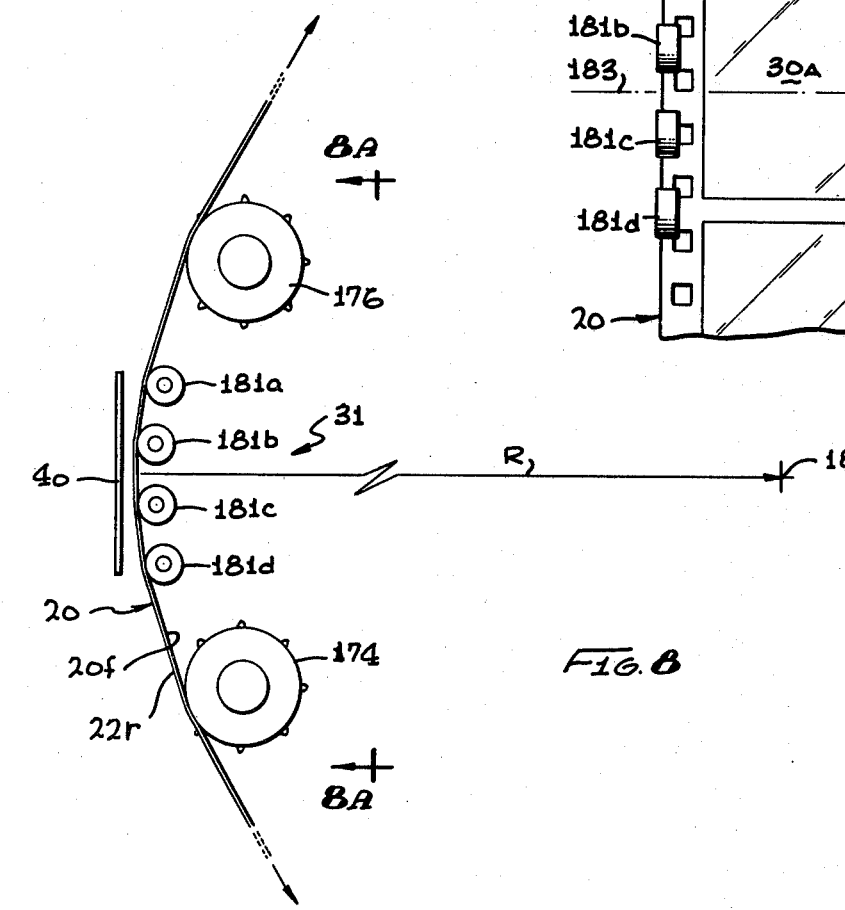
FIG. 8 is a partial side elevation view of the apparatus of FIG. 2.

By maintaining the film strip under tension while it is stationary, the frame which is being projected can be located close to the film plane. However, the film strip may tend to assume a warped configuration, so that a moderate tension may not locate all areas of the frame sufficiently close to the film plane to provide a clear image over most of the screen. It is found that better control of the configuration of the film frame which is at the imaging station, can be achieved by the apparatus shown in FIGS. 2 and 8 and 8A which slightly curves the region of the film that lies at the imaging station 31.

The appartus for slightly curving the film includes a group of four rollers 181a–181d (FIG. 8 and 8A) on either edge portion of the film strip, which guide the film into a slight curvature. The slightly curved film, which is curved about an axis 183 extending perpendicular to the length of the film strip, is braced by the slight curvature and tension, so that localized warping of the projected film frame is avoided. In one example, a film strip 20 of Mylar having a width of 35 mm and thickness of 0.1 mm was held under a tension of eight ounces, and urged toward a radius of curvature R of about one foot. The film frame image areas 30 were of one inch length and 0.75 inch width and the film was guided by rollers 181 which were each of one-quarter inch diameter. The console screen was located about thirty-eight inches in front of the film. When a projection lens of relatively simple design and moderate focal length, such as on the order of three or four inches is used, the slight curvature of the film provides a clearer image at the extreme top and bottom of the substantially flat screen than if the film frame were perfectly flat.

The moderately low tension under which the film is held, permits smooth curvature of the film so it can approximately, but not exactly, follow the path of the rollers. The edge guides formed by the rollers 181a–181d contact only the face 20f of the film nearest the screen, with the film tension being utilized to hold the film substantially against the rollers. Where rollers are used as the film guides, at least three rollers are required to define a curvature. Of course, not all areas of the projected film frame need be curved to the same radius. However, the radius R should be less than about 3 feet to obtain significant stabilizing from the curving. It is possible to support only the rearward face 20r of the film strip in a curved path, by placing the rollers 181 against the rearward face along opposite edge portions thereof. In that case, a projection lens should be chosen which will provide a clear image to the edge of the frame for such a direction of curvature.

FIG. 15 is a schematic diagram 180 of a circuit for operating the film transport arrangement shown in FIG. 2. An explanation of the general operation of the circuit will aid in understanding how the apparatus functions. As described earlier, the two reel motors 36, 38 are energized even when the film is not moving, in order to maintain tension in the film. The circuit includes a potentiometer 182 which determines the level of current to each motor, and therefore the motor torques, when the film is stationary. In addition to the current controlled by potentiometer 182, an additional current is delivered over line 184 to adjust the motor currents in accordance with the amount of film on the reels, to compensate for the change in diameters of the film rolls. The current on line 184 is received from an operational amplifier 186 which has an input received from a line 188 which carries a signal indicating the position of the film strip, that is, indicating the particular film frame which is at the projection position 30A (FIG. 2). The ten photocells 131c–140c deliver their outputs through three integrated circuits or "chips" 191–193, whose analog outputs over line 188 represent the film position. It may be noted that movement of the film is determined by the additional current supplied from operational amplifiers 194 and 196 whose currents are respectively delivered to the motors 38 and 36. When the film is stationary, there is little or no signal from either of the amplifiers 194 or 196.

In order to move the film, a group of switches 198 are operated (as by the output of frame select circuit 92 in FIG. 13) which changes the digital command determining the film frame to be brought into the projection position, and which causes a corresponding change in analog command signals. The change in command results in a large signal delivered from operational amplifier 200 representing the difference between the command signal on line 202, which is a command analog signal indicating the frame position to be obtained, and the analog signal on line 188 indicating the present frame position. The difference signal output of amplifier 200 passes through amplifier 204 to pins 1 and 11 of an integrated circuit or chip 206.

As mentioned above, line 188 carries the analog signal representing film position at any given time, while line 202 carries an analog signal representing the commanded position. Line 212 carries a signal when F equals C. Line 216 carries a signal when F is less than C. These output lines 212–216 are connected to pins of the integrated circuit 206, which determines which way to drive the film to bring the commanded film frame into the projected position.

The amplifier 200, whose output represents the analog difference between the actual film position and commanded film position, and which is delivered to the amplifier 204, controls the speed at which the film is driven, with the level of the analog signal on line 220 representing the amount of additional current to be delivered to the motor which is to wind up the film to determine its speed. As the difference between the actual and commanded film position decreases the speed of the film decreases. However, a minimum drive level or voltage, and therefore current, is maintained at the final approach, with the minimum level determined by the settings of potentiometers 222 and 224. In one apparatus which has been constructed, the minimum slow speed was set at about five frames per second, to minimize the access time to any given frame. However, this can lead to overshoot of the film, wherein the center of the desired film frame is slightly past the projection position when the film stops. As a result, circuitry is provided to shift back the film from the overshooted position, as will be described below.

During the "search" mode of operation, when the film is moving and the photocells 131c-140c are registering the identification numbers of the film frames which are passing the projection frame position, the four clock photocells 146-150 are sensing the film frame positions. One set of clock photocells 146, 148 which may be referred to as "clock detecting" sensors detect the passage of the clock markings 142 (FIG. 9) past the projection frame position. The other two photocells 144, 150 may be referred to as "clock guard" photocells which help guard against erroneous detections. When the clock detecting photocells 146, 148 are dark and the clock guard cells, 144, 150 are illuminated, a clock signal is generated which enters the clock inputs 230 of the chips 191-193 to gate the outputs of the ten photocells 131c-140c to the circuits 208-210. This assures that the readings of the photocells 131c-140c are taken only when the film frame is precisely centered on the group of cells.

When coincidence between the film position and command signals occurs, an F equals C signal is delivered from chip output 214 into the chip 206 to stop the delivery of extra current to one of the reel drive motors so that the film stops. As mentioned above, the film will have overshot its position when the reels stop. To return the film to centering, an incher oscillator 232 is provided which is turned on when the F equals C signal is generated, to apply pulses to the opposite motor to stop the film back into position. The oscillator includes a variable resistor 234 which controls the amount of energy per pulse of the oscillator by controlling the width of each pulse, and also includes a variable resistor 236 which controls the pulse repetition rate. The oscillator stays on and continues to drive the film back, until both clock detector photocells 146, 148 are dark. It may be noted that the clock guard photocells 144, 150 are utilized to monitor the condition of the projection lamp. If the lamp brightness changes, this changes a reference level signal that feeds all of the data photocells 131c-140c. If the lamp burns out, the amplifier 204 is prevented from delivering any drive voltage to the motors. The circuit of FIG. 15 represents one implementation of the film drive apparatus for the merchandising terminal, and other circuits that can be utilized such as a circuit utilizing a microprocessor as a master control.

Thus, the invention provides a merchandising terminal which can aid in the selection of products adapted to a customer's need. The terminal is constructed to display a succession of images showing different possible customer conditions, such as different colors of hair and skin, and includes a switch means that can be operated by a person viewing the images to select those portions of the image which are most appropriate to him, such as the model or color block which represents his or her hair or skin color. The terminal also includes a logic circuit responsive to the selections made by the person, to generate an output indicating the products particularly suited to the conditions of the person, such as particular cosmetics, and to select and display an image representing the output such as a model wearing selected cosmetics. The images can be stored as frame regions of a strip of film. In order to avoid scratching of the film while positioning a portion precisely on a film plane a pair of reel-driving motors apply torque to the reels even when the film is stationary. A film position-detecting circuit varies currents to the motors, to compensate for the changes in film roll diameters on the different reels as the film moves from one reel to the other. Customer selections of image regions are made by touching a screen of the console, with the finger of the person interrupting an infrared light beam so it cannot reach the photocell. In order to avoid distraction of the customer and maintain an aparent magical machine operation, a window is placed in front of the photo cells, the window being transparent to infrared light but opaque to visible light, so that the photocells cannot be seen. While the merchandising terminal can be utilized in the selection of cosmetics, it also can be utilized in a variety of other merchandising situations wherein the selection of one or more products can depend upon a plurality of different factors, or where the customer does not have a clear perception of his needs or the characteristics of products to be reviewed in light of those needs.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A terminal comprising:
   a first reel;
   a second reel;
   a strip of photographic film having a multiplicity of frames spaced along its length, said film having opposite ends forming rolls, each roll wound about one of said reels, and said film extending along a predetermined path between said reels, said path including a predetermined film plane region;
   means for sharply displaying the image of a film frame lying at said film plane region;
   guide means disposed along said film path outside the frame area being displayed, for holding a portion of said film substantially at said film plane region when said film is under tension;
   first and second motors coupled respectively to said first and second reels to cause them to rotate in directions to wind film thereon;
   means for energizing said motors, said energizing means being operable to energize said motors at levels that apply torques proportional to the diameters of the film rolls on said reels, so that equal pulling forces are applied to the film on opposite sides of the film plane region, whereby to maintain the film both stationary and under tension;
   said film including frame identification markings beside at least some frames that identifies those frames; and
   frame identification detecting means responsive to the markings of a film frame which lies at said image displaying means, for generating a signal indicating a particular film frame; and wherein
   said motor energizing means includes logic means responsive to said signal indicating a particular film frame, for adjusting the relative levels of current supplied to said motors when the film is stationary.

* * * * *